United States Patent
Neumann et al.

(10) Patent No.: US 10,473,206 B2
(45) Date of Patent: Nov. 12, 2019

(54) TRANSMISSION VENT

(71) Applicant: DEERE & COMPANY, Moline, IL (US)

(72) Inventors: Clayton P. Neumann, Cedar Falls, IA (US); David W. King, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 188 days.

(21) Appl. No.: 14/799,674

(22) Filed: Jul. 15, 2015

(65) Prior Publication Data
US 2017/0002919 A1 Jan. 5, 2017

Related U.S. Application Data
(60) Provisional application No. 62/187,931, filed on Jul. 2, 2015.

(51) Int. Cl.
*F16H 57/027* (2012.01)

(52) U.S. Cl.
CPC .................. *F16H 57/027* (2013.01)

(58) Field of Classification Search
CPC .............. F16H 57/027; F16H 57/0415; F16H 57/0416; F16H 57/0426; F16H 57/043; F16H 57/0431; F01M 2013/0422; F01M 13/04; F01M 13/0416; B01D 45/12; B01D 45/14; B01D 45/16

See application file for complete search history.

(56) References Cited

U.S. PATENT DOCUMENTS

| | | | |
|---|---|---|---|
| 3,001,804 A * | 9/1961 | Tomlinson | F16L 27/12 285/137.11 |
| 3,145,582 A | 8/1964 | Wagner | |
| 3,561,195 A * | 2/1971 | Bouru | B01D 45/14 415/180 |

(Continued)

FOREIGN PATENT DOCUMENTS

| | | |
|---|---|---|
| DE | 2845068 A1 | 4/1979 |
| DE | 19824041 A1 | 12/1999 |

(Continued)

OTHER PUBLICATIONS

EPO Translation of the Description of DE 19824041 A1, Häberlein, Dec. 2, 1999.*

(Continued)

*Primary Examiner* — Daniel D Yabut
(74) *Attorney, Agent, or Firm* — Klintworth & Rozenblat IP LLP

(57) ABSTRACT

In accordance with an example embodiment, a transmission may include a housing, a plurality of gears, and an input shaft having a vent with a first opening at a first end of the input shaft and a second opening at an outside diameter of the input shaft. The vent allows air flow between the interior and the exterior of the transmission. A breather tube may have a first opening positioned within the vent and a second opening positioned outside the vent. The first opening of the breather tube can be smaller than the first opening of the vent. A vent cover may be positioned over the second opening of the vent. The vent cover may have a first opening offset from the second opening of the vent.

15 Claims, 10 Drawing Sheets

(56) References Cited

U.S. PATENT DOCUMENTS

| | | | |
|---|---|---|---|
| 4,217,120 A | 8/1980 | Reynolds | |
| 4,987,795 A | 1/1991 | Nguyen | |
| 5,062,447 A | 11/1991 | Davison, Jr. et al. | |
| 5,114,446 A * | 5/1992 | Giersdorf | F01D 25/18 |
| | | | 55/345 |
| 7,517,392 B2 | 4/2009 | Neff et al. | |
| 7,644,572 B2 * | 1/2010 | Labala | F01D 25/18 |
| | | | 184/11.2 |
| 8,015,898 B2 | 9/2011 | Kitamura | |
| 8,690,716 B2 * | 4/2014 | Faust | F16H 55/56 |
| | | | 474/28 |
| 8,821,332 B2 | 9/2014 | Kawamura et al. | |
| 9,121,533 B2 * | 9/2015 | Kahle | F16L 21/035 |
| 2002/0083933 A1 * | 7/2002 | Schmid | F01L 1/047 |
| | | | 123/572 |
| 2005/0121262 A1 * | 6/2005 | Berger | F01M 13/04 |
| | | | 184/6.21 |
| 2011/0312427 A1 * | 12/2011 | Meusel | F01L 1/047 |
| | | | 464/183 |
| 2012/0010003 A1 | 1/2012 | Gallen et al. | |
| 2012/0312120 A1 | 12/2012 | Engelmann et al. | |
| 2014/0007736 A1 * | 1/2014 | Mueller | F01L 1/047 |
| | | | 74/567 |

FOREIGN PATENT DOCUMENTS

| | | |
|---|---|---|
| DE | 19931740 A1 | 1/2001 |
| DE | 102005022254 A1 | 11/2006 |
| WO | 2013056988 A1 | 4/2013 |

OTHER PUBLICATIONS

German Search Report in foreign counterpart application No. 102016211305.4 dated Oct. 11, 2016 (10 pages).

* cited by examiner

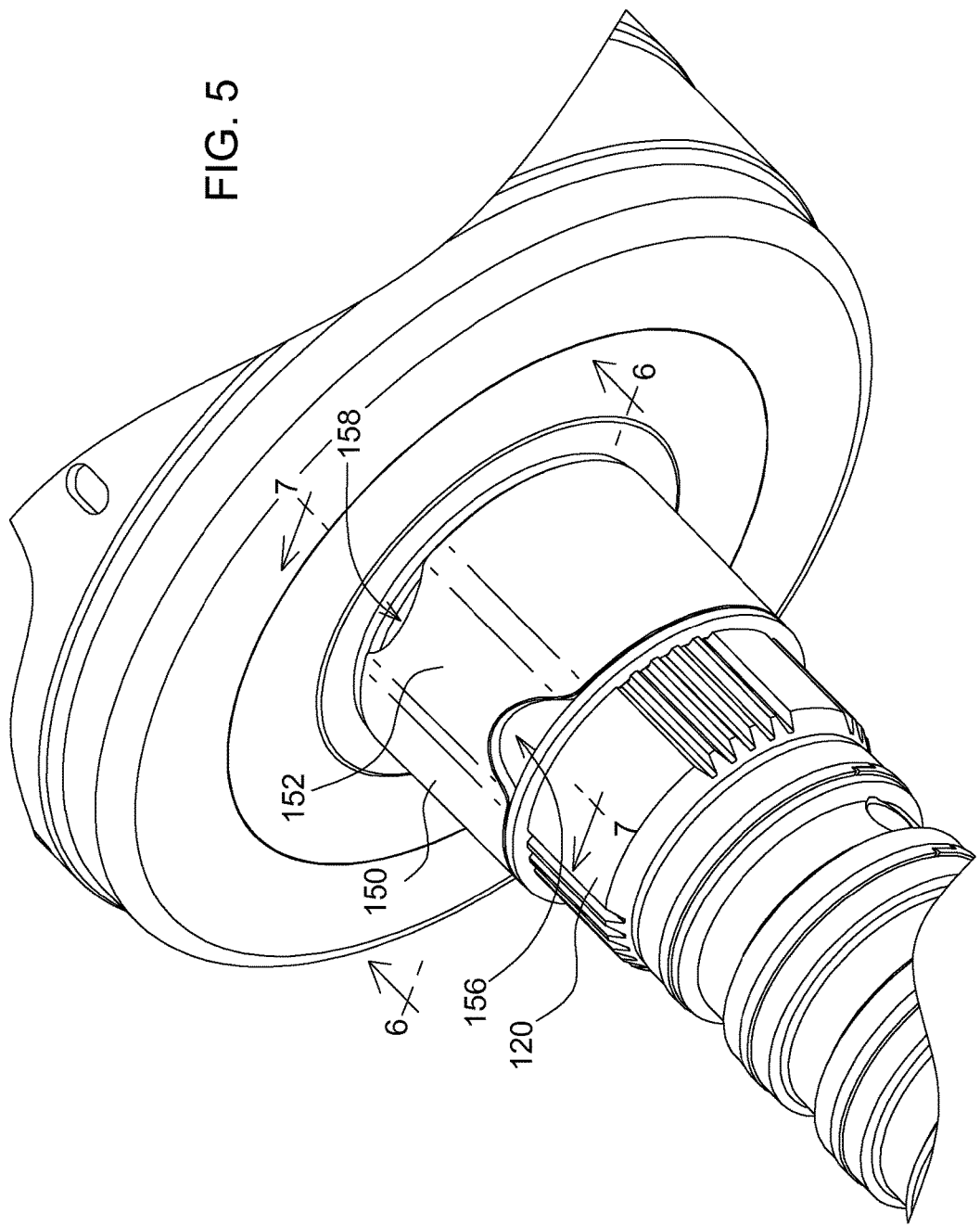

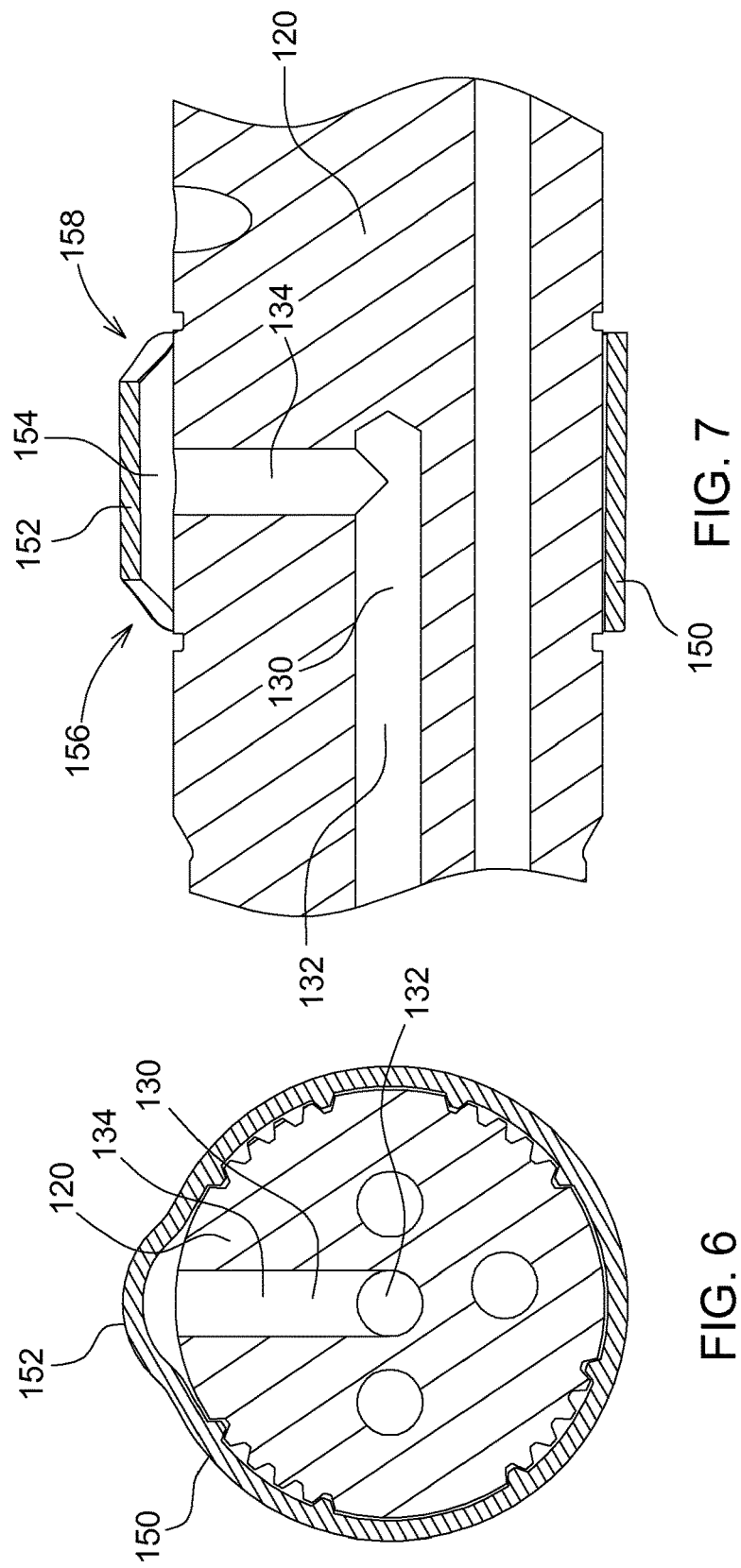

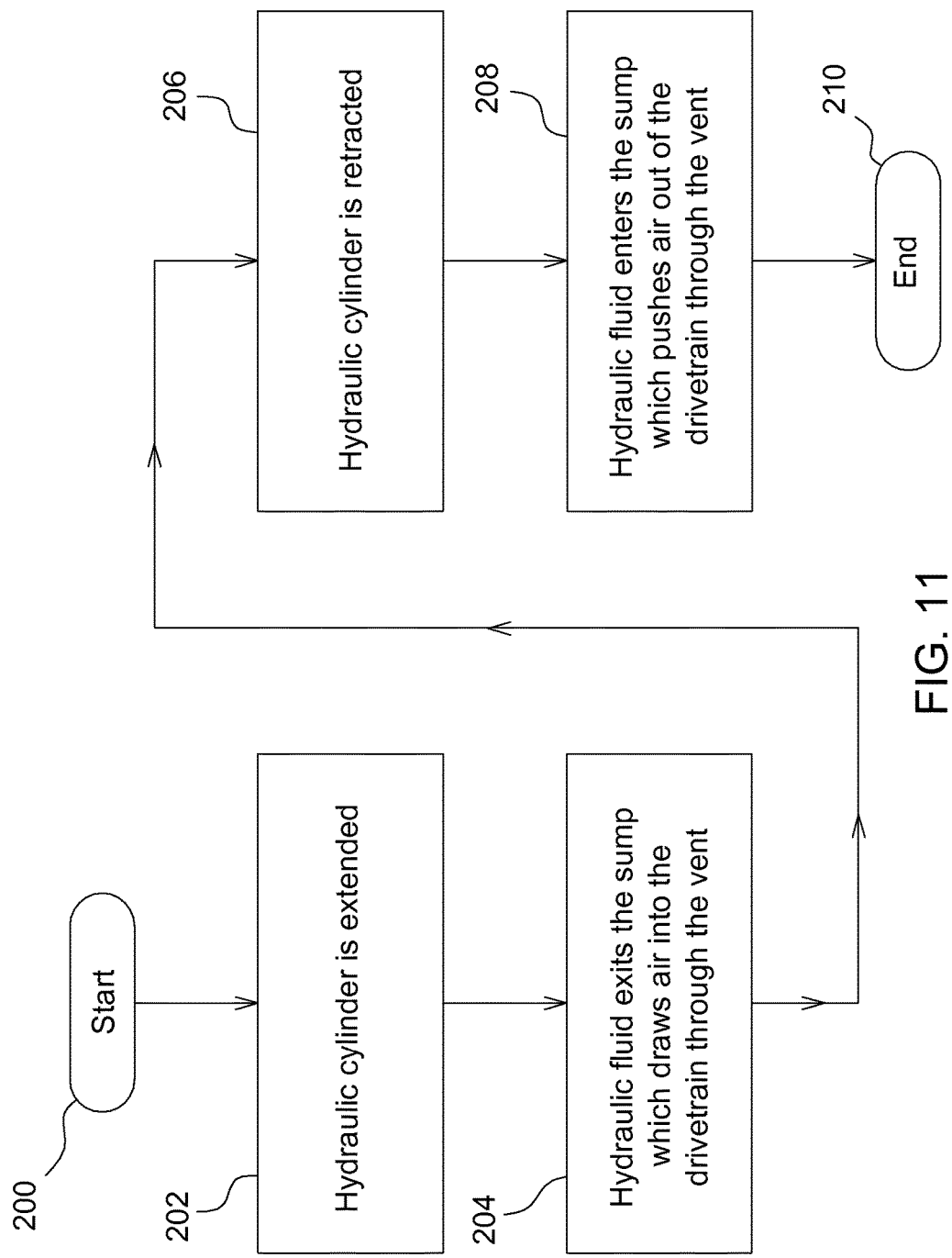

US 10,473,206 B2

TRANSMISSION VENT

CROSS-REFERENCE TO RELATED APPLICATIONS

This application claims the benefit of U.S. Provisional Application No. 62/187,931, titled Transmission Vent, filed Jul. 2, 2015, which is hereby incorporated by reference in its entirety.

FIELD OF THE DISCLOSURE

The present disclosure relates generally to vents used in transmissions for vehicles such as work machines.

BACKGROUND

Many vehicles include transmissions, which couple a power source, such as an internal combustion engine, to one or more differentials or axles connected to wheels or other ground engagement apparatus. Transmissions use gears to provide speed and torque variations from a power source to a differential or axle. Transmissions may include one or more vents to allow air to flow into and out of the transmission or drivetrain in order to maintain atmospheric pressure within the transmission or drivetrain.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a transmission may include a housing, a plurality of gears, and an input shaft having a vent with a first opening at a first end of the input shaft and a second opening at an outside diameter of the input shaft. The vent allows air flow through the input shaft between the interior and the exterior of the transmission. A breather tube may have a first opening positioned within the vent and a second opening positioned outside the vent. The first opening of the breather tube can be smaller than the first opening of the vent. A vent cover may be positioned over the second opening of the vent. The vent cover may have a first opening offset from the second opening of the vent.

According to an aspect of the present disclosure, a method of venting a transmission may include positioning a vent within an input shaft of the transmission, a first opening of the vent positioned at a first end of the input shaft and a second opening of the vent positioned at an outside diameter of the input shaft, the vent allowing air flow through the input shaft between the interior and the exterior of the transmission; positioning a breather tube within the first opening of the vent, a first opening of the breather tube positioned within the vent and a second opening of the breather tube positioned outside the vent, the first opening of the breather tube being smaller than the first opening of the vent; and positioning a vent cover over the second opening of the vent, the vent cover having a first opening offset from the second opening of the vent.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 5 is a perspective view of an input shaft including a vent cover, according to one embodiment;

FIG. 6 is a cross-sectional view of the vent cover shown in FIG. 5, according to one embodiment;

FIG. 7 is a top view of a vent cover, according to one embodiment;

FIG. 11 is a flow diagram illustrating a method maintaining ambient air pressure within a drivetrain, according to one embodiment.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
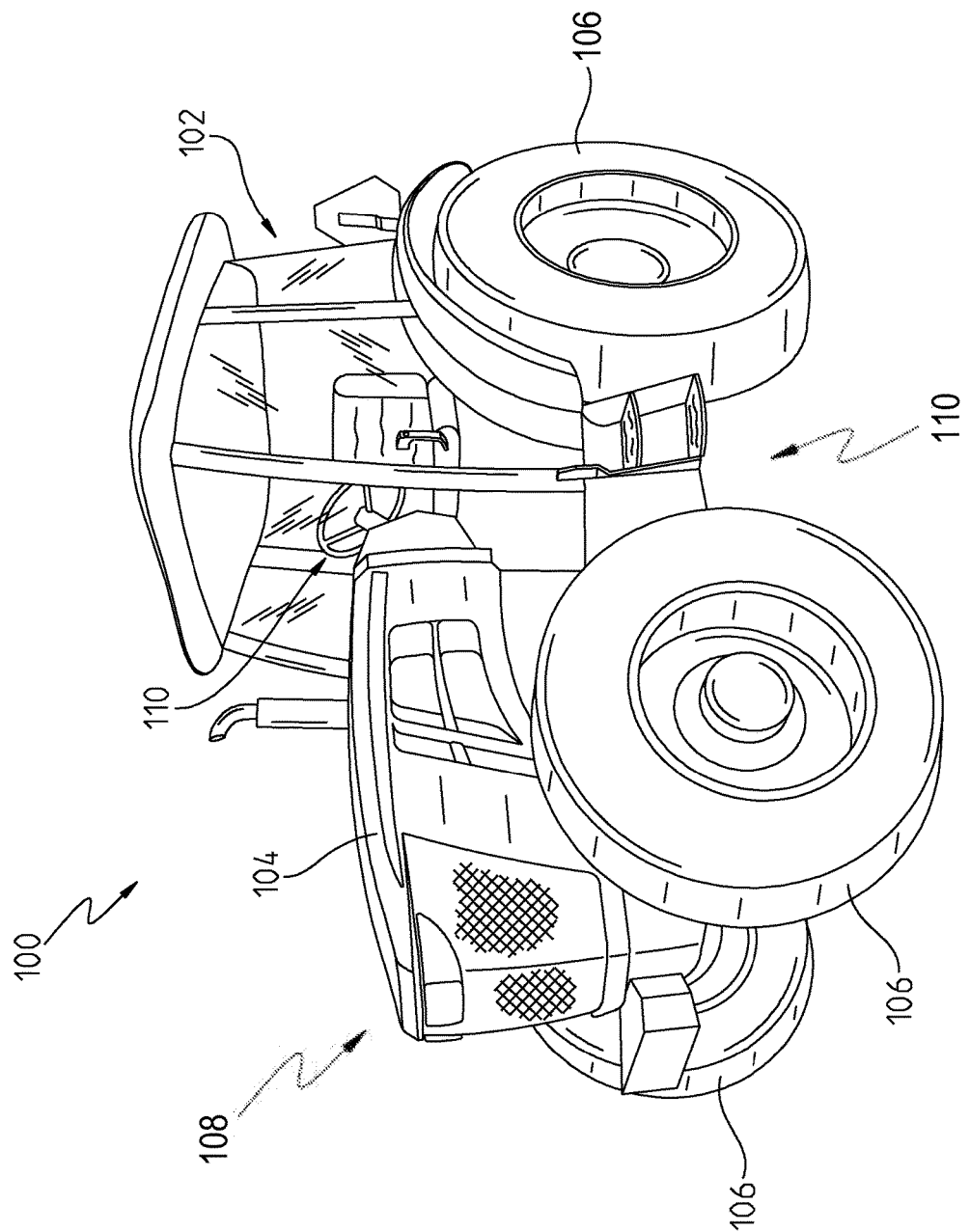
FIG. 1 is a perspective view of a work machine, according to one embodiment.

FIG. 1 illustrates a vehicle or work machine 100, such as a tractor, for example. The present disclosure also applies to other powered or motorized vehicles, machines, or equipment. The vehicle 100 may include an operator compartment or cab 102 where a machine operator may control the operation of the vehicle 100. The vehicle 100 may include a hood 104, one or more ground engaging apparatus 106, for example wheels, and a power source 108 located under the hood 104. The vehicle 100 may include a transmission 110, which couples the power source 108 to one or more wheels 106.

Figure 2:
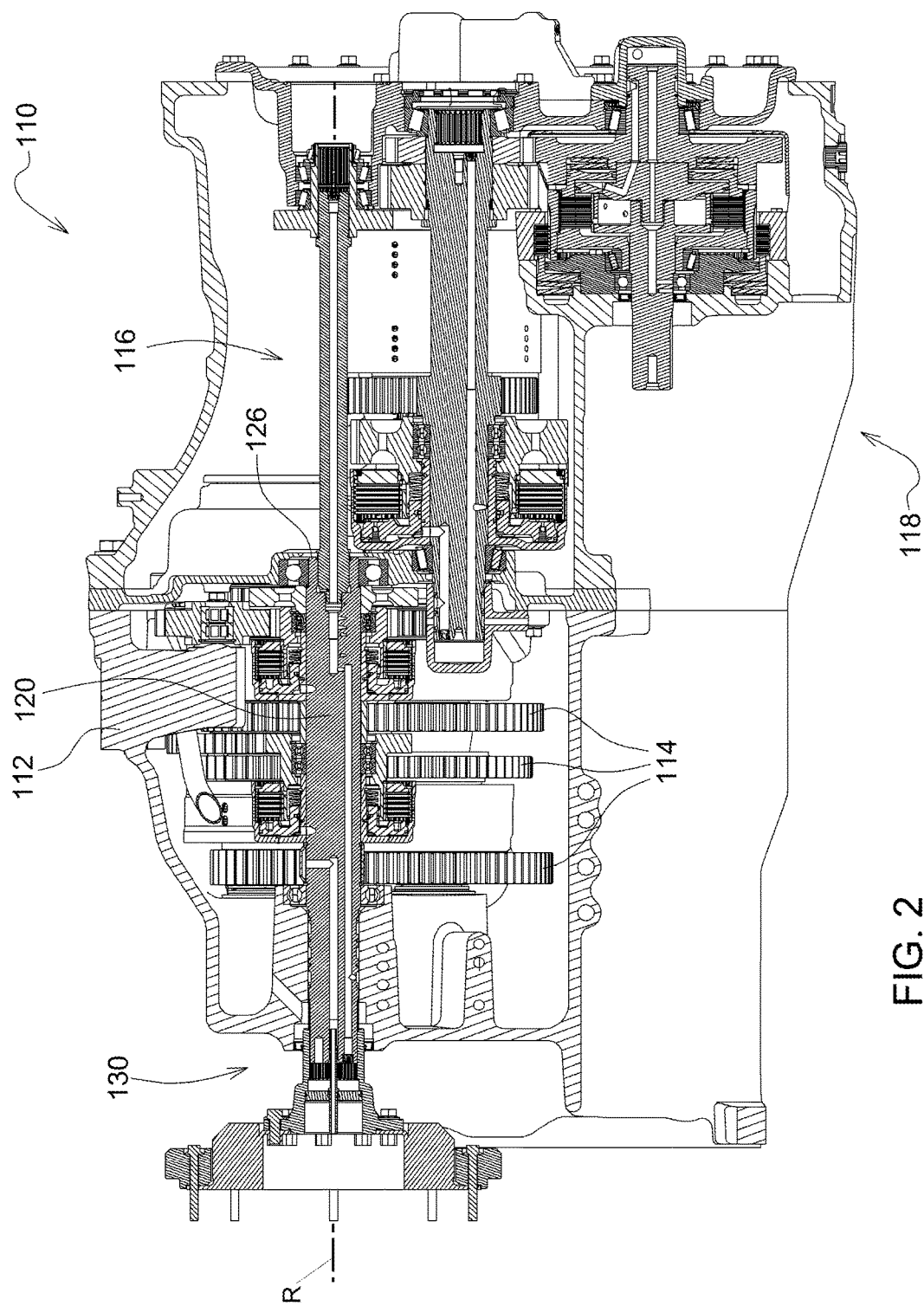
FIG. 2 is a cross-sectional view of a transmission, according to one embodiment.

FIG. 2 illustrates a cross-sectional view of a transmission 110, which may include a housing 112, and input shaft 120, and one or more gears 114. The transmission 110 may include a vent 130 which allows air flow into and out of the transmission 110, between the interior 116 of the transmission 110 and the exterior or atmosphere, to maintain atmospheric pressure within the transmission 110. The transmission 110 may include a hydraulic sump 118 containing a lubricating fluid such as hydraulic or transmission fluid. The lubricating fluid provides lubrication to the various shafts, gears, bearings, and other apparatus within the transmission 110. The lubricating fluid may be directed to the various apparatus throughout the transmission 110.

Figure 3:
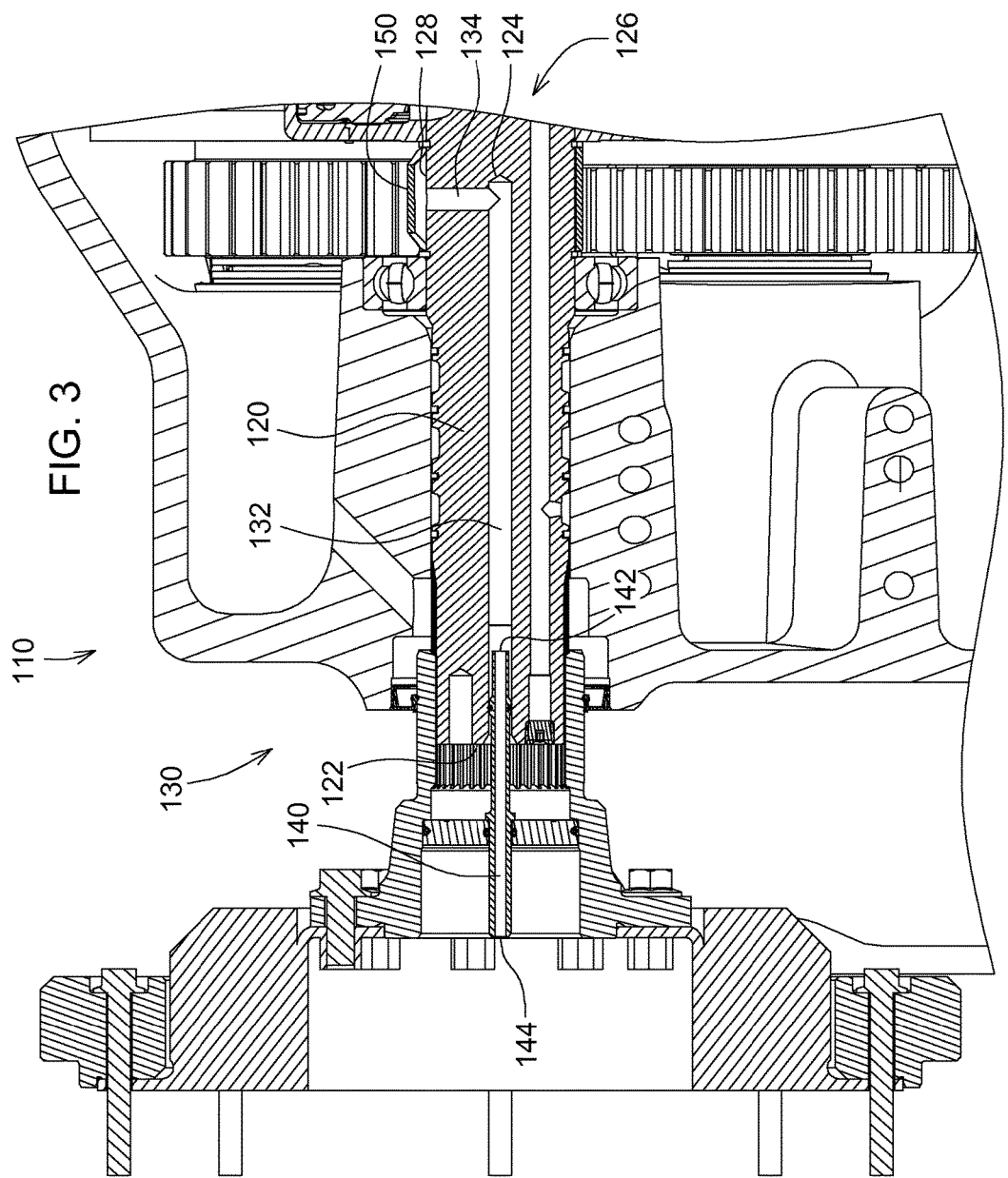
FIG. 3 is an enlarged partial cross-sectional view of a portion of the transmission, according to one embodiment.

FIG. 3 illustrates an enlarged partial cross-sectional view of the vent 130, which may include an axial conduit 132 extending along a portion of the length of the input shaft 120 and a radial conduit 134 extending from the axial conduit 132 to the outer diameter 128 of the input shaft 120. The axial conduit 132 may extend from a first opening at the first end 122 of the input shaft 120 to an intermediate position 124, terminating prior to a second end 126 of the input shaft 120. (The second end 126 of the input shaft 120 is shown in FIG. 2.) The axial conduit 132 may extend substantially parallel to the axis of rotation ("R" in FIG. 2) of the input shaft 120, as shown. The radial conduit 134 may extend from a position at or near the intermediate position 124 to the outer diameter 128 of the input shaft 120. The radial conduit 134 is connected to the axial conduit 132 so that fluid may flow between the axial and radial conduits 132, 134. The radial conduit 134 may extend substantially perpendicular to the axis of rotation of the input shaft 120, as shown. Alternatively, the radial conduit 134 may extend at any angle between parallel and perpendicular. In some embodiments, the vent 130 includes a single conduit extending from the first end of the input shaft 120 to the outer diameter 128 of the input shaft 120. This single conduit could be substantially straight or curved.

Figure 4:
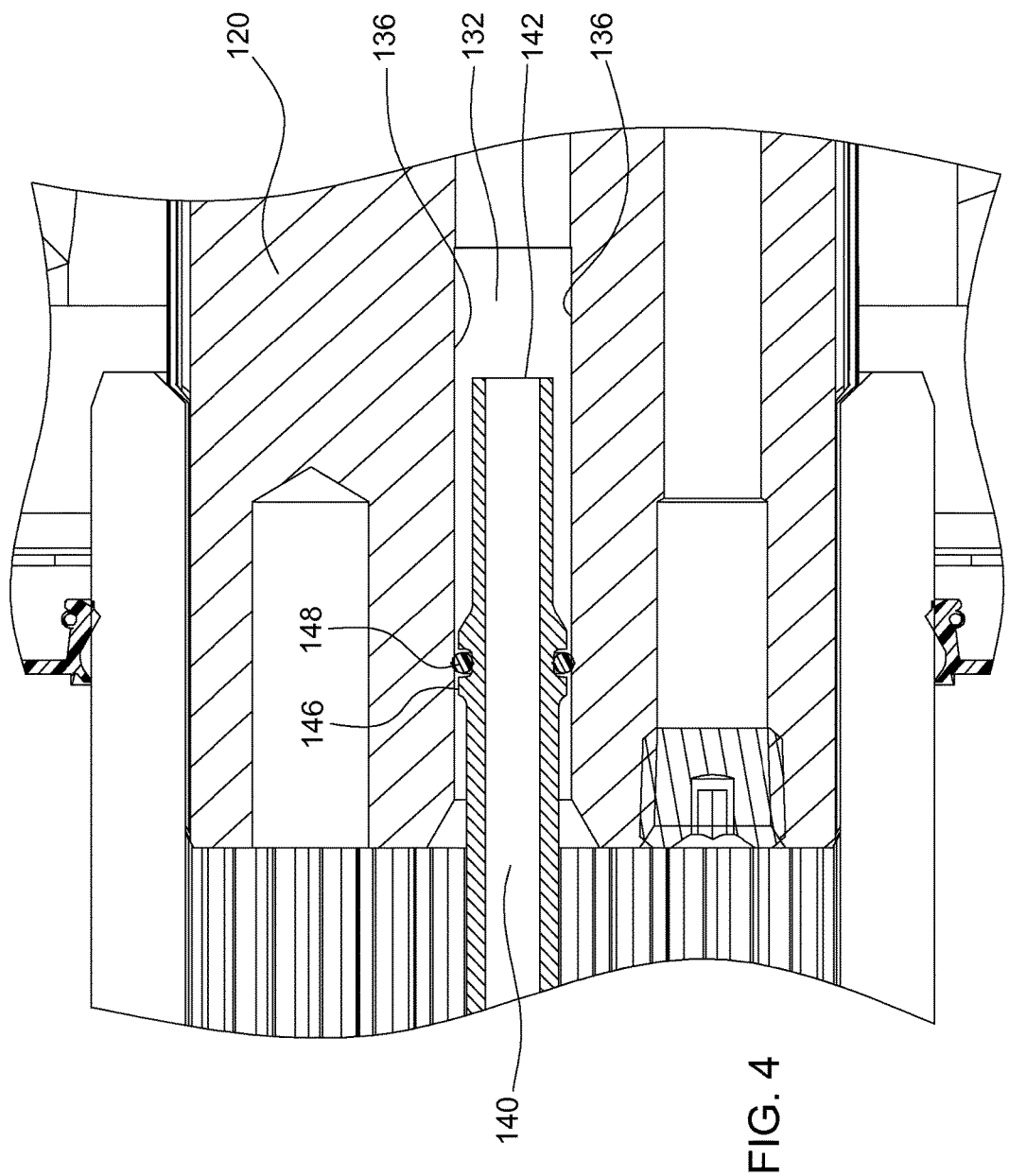
FIG. 4 is an enlarged partial cross-sectional view of a breather tube positioned within a vent of an input shaft, according to one embodiment.

A breather tube 140 may be positioned within a portion of the vent 130, as shown in FIG. 3. The breather tube 140 may be positioned within a portion of axial conduit 132 of the input shaft 120. The breather tube 140 may have a first end 142 positioned inside the axial conduit 132 of the input shaft 120 and a second end 144 positioned outside the axial conduit 132. The first end 142 of the breather tube 140 has a smaller cross-section than the axial conduit 132, as shown in FIG. 4. The first end 142 of the breather tube 140 may have an inner diameter which is smaller than the diameter of the axial conduit 132. The breather tube 140 allows air flow between the axial conduit 132 and the exterior of the transmission 110 or atmosphere. Because the breather tube 140 has a smaller cross-section than the vent 130, any lubricating fluid in the vent 130 must reach a certain level before from leaking out of the vent 130. The breather tube 140 may be coupled with the input shaft 120 so that the breather tube 140 rotates with the input shaft 120. The breather tube 140 may have an enlarged portion 146 with a seal 148, for example an O-ring, which reduces or minimizes the flow of lubricating fluid between the outside of the breather tube 140 and the axial conduit 132. The enlarged portion 146 and seal 148 may connect the breather tube 140 to the input shaft 120 so that they rotate together. The first end 142 of the breather tube 140 may be sized so that the first end 142 does not contact the wall 136 of the vent 130. The position and size of the breather tube 140 relative to the vent 130 reduces or minimizes the amount of lubricating fluid leaking out of the breather tube 140 to the exterior of the transmission 110 or atmosphere.

A vent cover 150 may be positioned over the vent 130, as shown in FIG. 3. The vent cover 150 may be positioned over the radial conduit 134 near the outer diameter 128 of the input shaft 120. The vent cover 150 can direct any fluid that contacts the vent cover 150 away from the vent 130. The vent cover 150 can be positioned around the input shaft 120, as shown in FIG. 5. The vent cover 150 may partially extend around the circumference of the input shaft 120 or completely extend around the circumference of the input shaft 120. The vent cover 150 can be connected to the input shaft 120 so that the vent cover 150 maintains its position relative to the radial conduit 134. The vent cover 150 can be connected to the input shaft 120 so that the vent cover 150 rotates with the input shaft 120. In some embodiments, the vent cover 150 is integral with the input shaft 120. The vent cover 150 may include a raised portion 152 positioned over the radial conduit 134 to allow air flow into and out of the vent cover 150, as shown in FIGS. 3, 6, and 7. The raised portion 152 can direct any lubricating fluid which contacts the vent cover 150 away from the radial conduit 134 of the vent 130. The raised portion 152 can be centered over the radial conduit 134 in the longitudinal direction, the radial direction, or both. The raised portion 152 forms a conduit 154 having one or more openings 156, 158. When the raised portion 152 has two openings 156, 158, the openings 156, 158 may be positioned at opposite ends of the raised portion 152 allowing air flow within the conduit 154 in opposite directions. The one or more openings 156, 158 may be offset from the radial conduit of the vent 130, which allows air flow into and out of the vent 130 while reducing or minimizing the amount of fluid entering the vent 130. The various shafts, gears, bearings, and other apparatus within the transmission 110 may intentionally or unintentionally direct lubricating fluid towards the vent 130, which the vent cover 150 can then redirect away from the vent 130.

In addition to the geometry and position of the breather tube 140, the vent cover 150, or both, the rotation of the input shaft 120 may also assist with reducing or minimizing the amount of lubricating fluid exiting the transmission 110. The rotation of the input shaft 120 causes any lubricating fluid within the axial conduit 132 to move outward to the wall 136 of the vent 130 due to centrifugal force. Because the breather tube 140 has a smaller cross-section than the vent 130, the lubricating oil remains adjacent to the wall 136 within the vent 130 instead of exiting through the breather tube 140. The rotation of the input shaft 120 also causes the lubricating fluid to travel from the axial conduit 132, out of the radial conduit 134, through the vent cover 150, and back into the interior 116 of the transmission 110.

Figure 8:
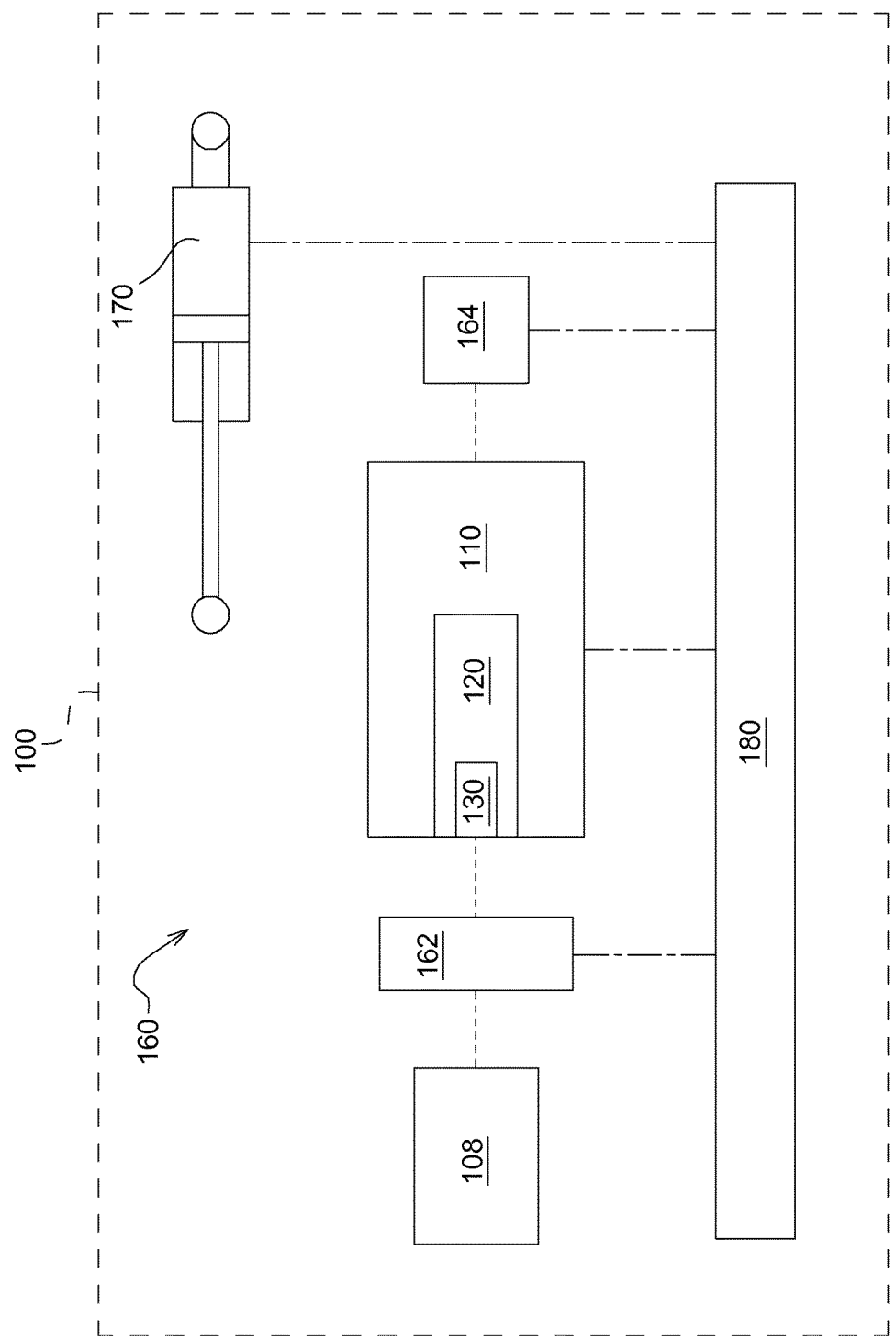
FIG. 8 is a schematic view of a drivetrain including a transmission, according to one embodiment.

FIG. 8 illustrates an implementation of a transmission vent 130 in a vehicle 100, according to one embodiment. The vehicle 100 may include a drivetrain 160 having a power source 108 coupled to a transmission 110 via a coupling device 162, such as a clutch or torque converter. The transmission 100 may be coupled to one or more drivetrain apparatus 164, such as a differential. The transmission 110 may include a vent 130. The vehicle 100 may include one or more single acting or double acting hydraulic cylinders 170. One or more of the coupling device 162, transmission 110, drivetrain apparatus 164, and hydraulic cylinder 170 may be fluidly connected to a common or shared hydraulic sump 180. Each of these apparatus may remove fluid from or return fluid to the hydraulic sump 180. When fluid is removed from the hydraulic sump 180, air enters through the vent 130 to maintain the air pressure within the drivetrain 160 at atmospheric pressure. When fluid is added or returned to the hydraulic sump 180, air exits through the vent 130 to maintain the air pressure within the drivetrain 160 at atmospheric pressure.

Figure 9:
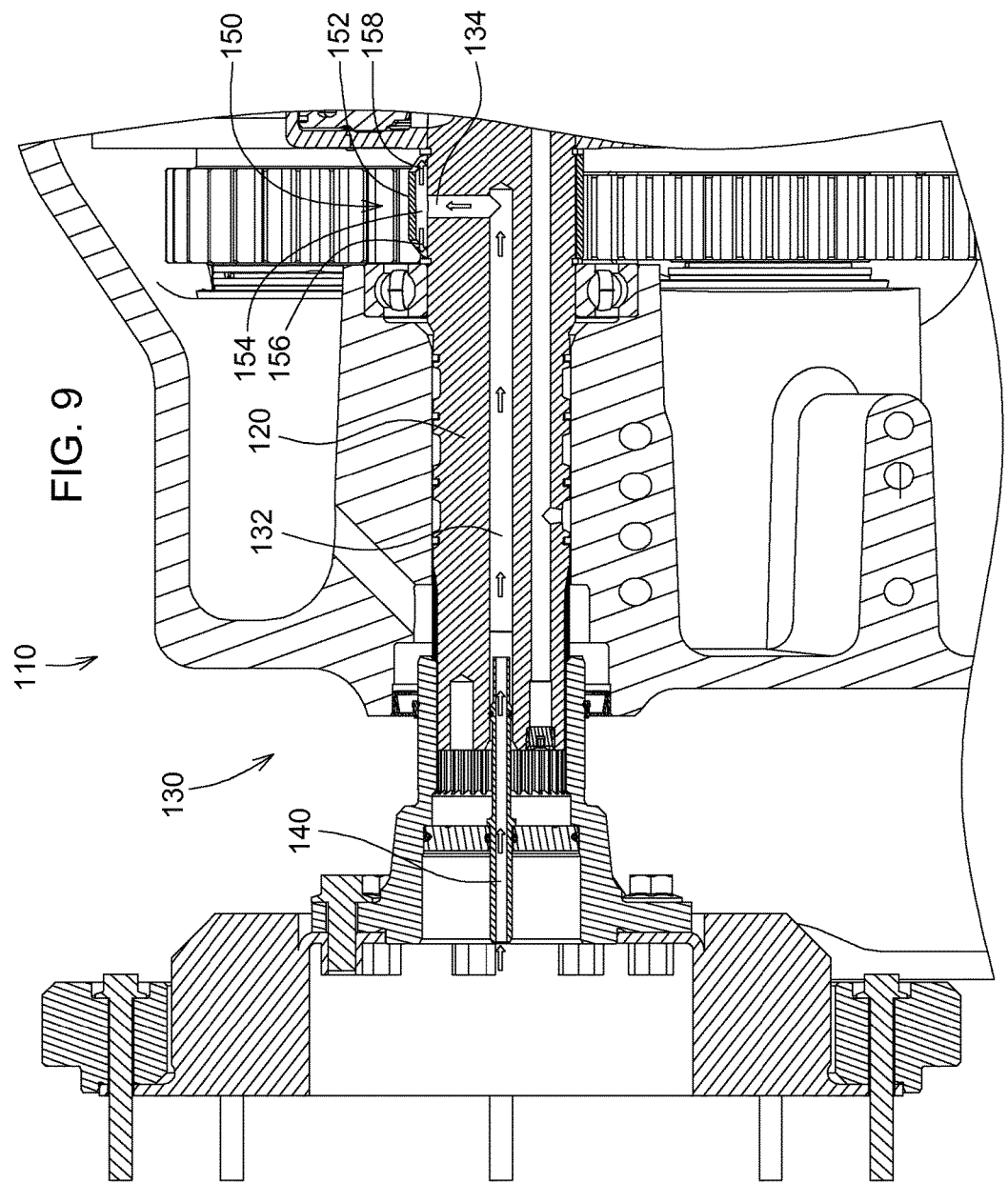
FIG. 9 is an enlarged partial cross-sectional view illustrating the flow of air into a transmission through a vent, according to one embodiment.

FIG. 9 illustrates air flow into a transmission 110 through a vent 130, according to one embodiment. Air pressure within the transmission 110 can decrease below atmospheric pressure due a decrease in air temperature within the transmission or due to a decrease in hydraulic fluid volume. When the air pressure within the transmission 110 decreases below atmospheric pressure, air is drawn into the transmission 110 through the vent 130. Ambient air enters the breather tube 140 and travels parallel to the axis of rotation of the input shaft 120 through the axial conduit 132, which has a larger cross-sectional area than the breather tube 140 reducing the velocity of the air flow when entering the axial conduit 132. The air flow then travels perpendicular to the axis of rotation of the input shaft 120 through the radial conduit 134. The radial conduit 134 may have a larger cross-sectional area than the axial conduit 132 reducing the velocity of the air flow when entering the radial conduit 134 from the axial conduit 132. The air flow then enters the conduit 154 formed by the raised portion 152 of the vent cover 150. The air flow again travels parallel to the axis of rotation of the input shaft 120 out through the one or more openings 156, 158. The conduit 154 may have a larger cross-sectional area than the radial conduit 134 reducing the velocity of the air flow when entering the conduit 154 from the radial conduit 134. Additionally, when the conduit 154 has two openings 156, 158, the air flow is divided between these openings 156, 158 further reducing the velocity of the air flow exiting the conduit 154 into the interior 116 of the transmission 110.

The velocity of the air flow exiting the one or more openings 156, 158 in the vent cover 150 into the interior 116 of the transmission 110 can be considerably slower than the velocity of the air flow entering the breather tube 140 from the atmosphere. This relatively low velocity air flow entering the interior 116 of the transmission 110 creates less disruption than a high velocity air flow. The relatively low velocity air flow exits the one or more openings 156, 158 in the vent cover 150 in a path parallel to the axis of rotation of the input shaft 120.

Figure 10:
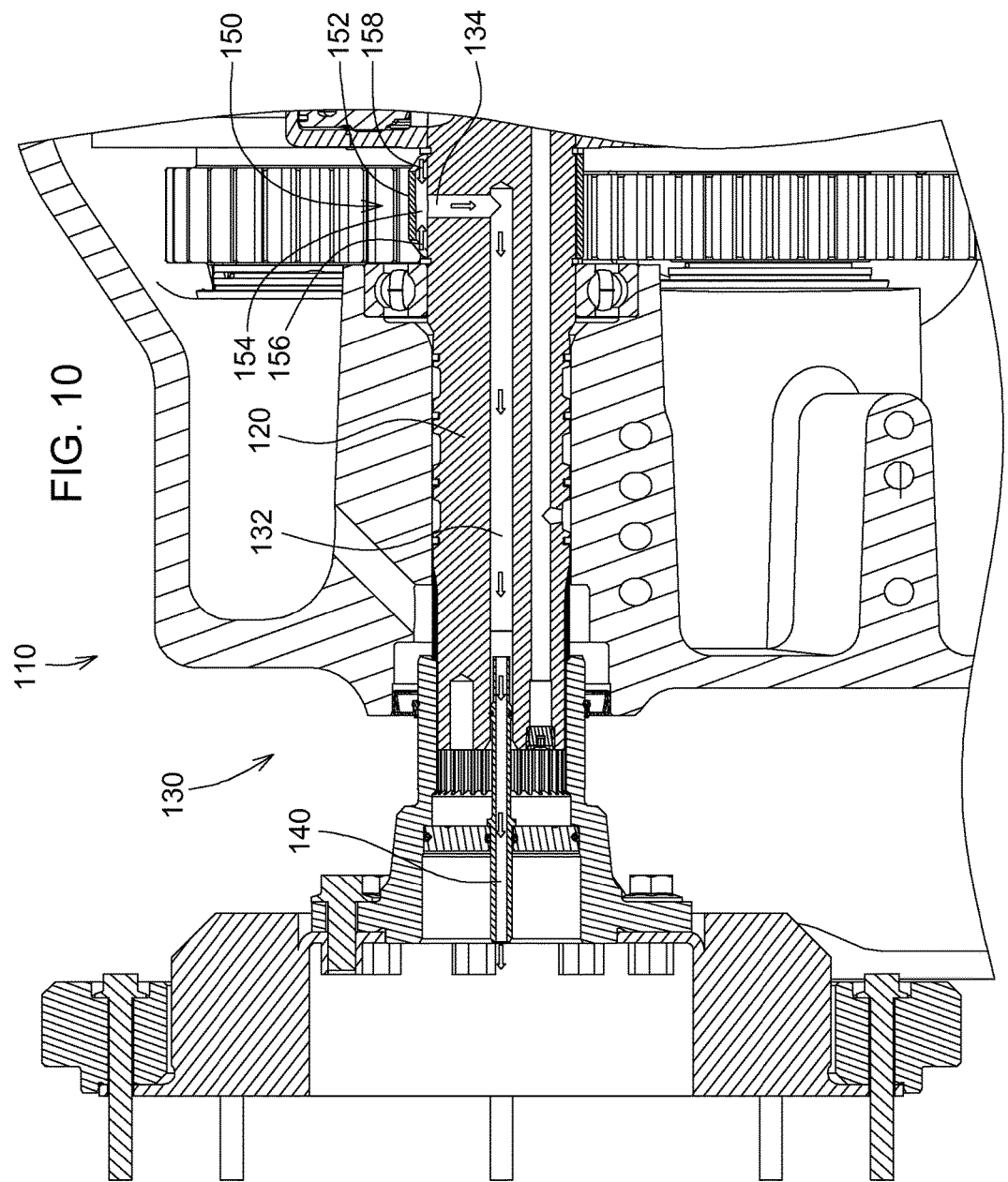
FIG. 10 is an enlarged partial cross-sectional view illustrating the flow of air out of a transmission through a vent, according to one embodiment.

FIG. 10 illustrates air flow out of a transmission 110 through a vent 130, according to one embodiment. Air pressure within the transmission 110 can increase above atmospheric pressure due an increase in air temperature within the transmission or due to an increase in hydraulic fluid volume. When the air pressure within the transmission 110 increases above atmospheric pressure, air is forced out of the transmission 110 through the vent 130. Air from within the interior 116 of the transmission 110 enters the one or more openings 156, 158 of the vent cover 150. When the conduit 154 has two openings 156, 158, the air flow enters the vent cover 150 at a lower velocity because the air flow is divided between the two openings 156, 158. The air flow travels parallel to the axis of rotation of the input shaft 120 through the conduit 154 formed by the raised portion 152 of the vent cover 150. The air flow enters the radial conduit 134 from the conduit 154 and travels perpendicular to the axis of rotation of the input shaft 120. The radial conduit 134 may have a smaller cross-sectional area than the conduit 154 causing the velocity of the air flow to increase in the radial conduit 134. If there are two openings 156, 158 into the conduit 154, then the air flow joins together as it enters the radial conduit 134 further increasing the velocity of the air flow. The air flow enters the axial conduit 132 from the radial conduit 134 and travels parallel to the axis of rotation of the input shaft 120. The axial conduit 132 may have a smaller cross-sectional area than the radial conduit 134 causing the velocity of the air flow to increase when entering the axial conduit 132. The air flow enters the breather tube 140 and exits to the atmosphere. The breather tube 140 has a smaller cross-sectional area than the axial conduit 132 causing the velocity of the air flow to increase when entering the breather tube 140 from the axial conduit 132.

The velocity of the air flow entering the one or more openings 156, 158 in the vent cover 150 from the interior 116 of the transmission 110 can be considerably slower than the velocity of the air flow exiting the breather tube 140 into the atmosphere. This relatively low velocity air flow entering the one or more openings 156, 158 in the vent cover 150 reduces or minimizes the amount of lubricating fluid withdrawn from the interior 116 of the transmission 110 into the vent 130. In addition, because the one or more openings 156, 158 are offset from the vent 130, the air flow travels through the vent cover 150 in a path parallel to the rotational axis of the input shaft 120 before reaching the vent 130.

FIG. 11 illustrates a flow chart for a method of maintaining ambient air pressure within a drivetrain, according to one embodiment, which may be implemented in one or more of the embodiments described herein and depicted in the various FIGURES. At step 200, the method starts.

At step 202, fluid is pumped from the hydraulic sump 180 into the hydraulic cylinder 170 and the hydraulic cylinder 170 is extended.

At step 204, the amount of fluid removed from the hydraulic sump 180 must be replaced with air, for example through the vent 130, so that the air pressure within the hydraulic sump 180, and in the drivetrain 160, remains at atmospheric pressure.

At step 206, fluid flows from the hydraulic cylinder 170 back into the hydraulic sump 180 and the hydraulic cylinder 170 is retracted.

At step 208, the amount of fluid returned to the hydraulic sump 180 expels an associated or proportional volume of air, for example through the vent 130, to maintain the hydraulic sump 180, and the drivetrain 160, at atmospheric pressure. When a large volume of fluid flows back into the hydraulic sump 180, the fluid can mix with air and create a spray or mist within the interior 116 of the transmission 110. The vent cover 150 can redirect any of this fluid that contacts the vent cover 150 away from the vent 130. The relatively large openings 156, 158 in the vent cover 150 allow a larger volume of air to flow into the vent 130 at a lower velocity, which reduces or minimizes the amount of fluid drawn into the vent 130.

At step 210, the method of maintaining the ambient air pressure within a drivetrain completes, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is an air vent which maintains the ambient air pressure within a transmission and reduces or minimizes the amount of lubricating fluid which enters the air vent. Another technical effect of one or more of the example embodiments disclosed herein is a breather tube that reduces or minimizes the amount of lubricating fluid which may have entered the air vent from exiting the transmission. Another technical effect of one or more of the example embodiments disclosed herein is a vent cover which reduces or minimizes the amount of lubricating fluid entering an air vent located within an input shaft of the transmission.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes,"

"including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A transmission comprising:
   a housing;
   a plurality of gears;
   an input shaft having a vent with a first opening at a first end of the input shaft and a second opening at an outside diameter of the input shaft, the vent including a first conduit extending from the first opening and a second conduit extending from the second opening to the first conduit;
   a breather tube having a first opening positioned within the vent and a second opening positioned outside the vent; and
   a vent cover positioned over the second opening of the vent, the vent cover having a first opening offset from the second opening of the vent;
   wherein the first opening of the vent has a smaller cross sectional area than the second opening of the vent; and
   wherein the first opening of the vent is axially between the first and second openings of the breather tube and the first opening of the breather tube is axially between the first and second openings of the vent.

2. The transmission of claim 1, wherein the first conduit of the vent is substantially parallel with the input shaft and the second conduit of the vent is substantially perpendicular to the input shaft.

3. The transmission of claim 1, wherein the breather tube rotates with the input shaft.

4. The transmission of claim 1, wherein the vent cover rotates with the input shaft.

5. The transmission of claim 1, wherein the second opening of the breather tube is positioned outside the housing.

6. The transmission of claim 1, wherein the breather tube includes an enlarged portion in contact with the wall of the vent.

7. The transmission of claim 1, wherein the first opening of the vent cover is substantially perpendicular to the second opening of the vent.

8. The transmission of claim 1, wherein the first opening of the vent cover has a larger cross sectional area than the second opening of the vent.

9. The transmission of claim 1, wherein the vent cover includes a second opening offset from the second opening of the vent.

10. The transmission of claim 9, wherein the first opening of the vent cover is positioned at a first end of the vent cover and the second opening is positioned at a second end of the vent cover.

11. The transmission of claim 1, wherein the first opening of the breather tube has a smaller cross sectional area than the first opening of the vent.

12. A transmission comprising:
    a housing;
    a plurality of gears;
    an input shaft having a vent with a first opening at a first end of the input shaft and a second opening at an outside diameter of the input shaft, the vent including a first conduit extending from the first opening and a second conduit extending from the second opening to the first conduit;
    a breather tube having a first opening positioned within the vent and a second opening positioned outside the vent; and
    a vent cover positioned over the second opening of the vent, the vent cover having a first opening offset from the second opening of the vent;
    wherein the second conduit has a larger cross sectional area than the first conduit; and
    wherein the first opening of the vent is axially between the first and second openings of the breather tube and the first opening of the breather tube is axially between the first and second openings of the vent.

13. The transmission of claim 12, wherein the vent cover defines a conduit having a larger cross sectional area than the second conduit.

14. The transmission of claim 13, wherein the breather tube defines a conduit that has a smaller cross sectional area than the first conduit.

15. A transmission comprising:
    a housing;
    a plurality of gears;
    an input shaft having a vent with a first opening at a first end of the input shaft and a second opening at an outside diameter of the input shaft, the vent including a first conduit extending from the first opening and a second conduit extending from the second opening to the first conduit;
    a breather tube having a first opening positioned within the vent and a second opening positioned outside the vent; and
    a vent cover positioned over the second opening of the vent, the vent cover having a first opening offset from the second opening of the vent;
    wherein the vent cover includes a second opening;
    wherein the first opening of the vent cover is at a first axial side of the second opening of the vent and the second opening of the vent cover is at a second axial side of the second opening of the vent; and
    wherein the second opening of the vent is substantially axially centered between the first and second openings of the vent cover; and
    wherein the first opening of the vent is axially between the first and second openings of the breather tube and the first opening of the breather tube is axially between the first and second openings of the vent.

* * * * *